United States Patent
Kalavakuru et al.

(10) Patent No.: US 11,799,528 B2
(45) Date of Patent: Oct. 24, 2023

(54) REDUCING LEAKAGE IN MULTI-LINK DEVICES

(71) Applicant: Cisco Technology, Inc., San Jose, CA (US)

(72) Inventors: Sivadeep R. Kalavakuru, Akron, OH (US); Ardalan Alizadeh, Milpitas, CA (US); Gautam D. Bhanage, Milpitas, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 17/305,237

(22) Filed: Jul. 1, 2021

(65) Prior Publication Data
US 2023/0006722 A1 Jan. 5, 2023

(51) Int. Cl.
*H04B 7/06* (2006.01)
*H04B 7/155* (2006.01)
*H04B 17/336* (2015.01)
*H04B 17/318* (2015.01)

(52) U.S. Cl.
CPC ....... *H04B 7/0617* (2013.01); *H04B 7/15564* (2013.01); *H04B 17/318* (2015.01); *H04B 17/336* (2015.01)

(58) Field of Classification Search
CPC . H04B 17/318; H04B 17/336; H04B 7/15564
See application file for complete search history.

(56) References Cited

U.S. PATENT DOCUMENTS

| | | | |
|---|---|---|---|
| 9,450,695 B2 * | 9/2016 | Zhu | H04J 11/0093 |
| 10,879,627 B1 * | 12/2020 | Frigon | H01Q 21/08 |
| 11,024,961 B2 | 6/2021 | Anderson et al. | |
| 11,089,595 B1 * | 8/2021 | Frigon | H01Q 21/065 |
| 2017/0223749 A1 | 8/2017 | Sheldon et al. | |
| 2018/0352461 A1 * | 12/2018 | Guirguis | H04B 7/0695 |
| 2019/0013883 A1 | 1/2019 | Tercero Vargas et al. | |
| 2019/0182888 A1 * | 6/2019 | Ahn | H04W 72/1215 |
| 2019/0215215 A1 * | 7/2019 | Maltsev | H04W 72/0453 |
| 2019/0253966 A1 * | 8/2019 | Park | H04L 5/0091 |
| 2020/0221413 A1 * | 7/2020 | Jones | G01S 1/14 |
| 2020/0244362 A1 * | 7/2020 | Ashrafi | H04L 27/3405 |
| 2020/0260463 A1 * | 8/2020 | Lovlekar | H04W 36/0085 |

(Continued)

FOREIGN PATENT DOCUMENTS

WO  2021091763 A1  5/2021

OTHER PUBLICATIONS

Deng, Cailian & Fang, Xuming & Han, Xiao & Wang, Xianbin & Yan, Li & He, Rong & Long, Yan & Guo, Yuchen. (2020). IEEE 802.11be—Extremely High Throughput WLAN: New Challenges and Opportunities.

(Continued)

*Primary Examiner* — Anh Vu H Ly
(74) *Attorney, Agent, or Firm* — Patterson + Sheridan, LLP

(57) ABSTRACT

A method includes measuring an interference caused by a first radio in a multi-link device to a second radio of the multi-link device and in response to determining that the interference exceeds a threshold, repeatedly narrowing a transmission beam width of the first radio until the interference falls below the threshold.

16 Claims, 5 Drawing Sheets

(56) References Cited

U.S. PATENT DOCUMENTS

2021/0219303 A1* 7/2021 Khalid ................ H04W 48/20
2023/0033619 A1* 2/2023 Lovlekar .............. H04W 24/10

OTHER PUBLICATIONS

Zufan Zhang, Honghui Yu, Beam interference suppression in multi-cell millimeter wave communications, Digital Communications and Networks, vol. 5, Issue 3, 2019, pp. 196-202, ISSN 2352-8648.
E. Khorov, I. Levitsky and I. F. Akyildiz, "Current Status and Directions of IEEE 802.11be, the Future Wi-Fi 7," in IEEE Access, vol. 8, pp. 88664-88688, 2020, doi: 10.1109/ACCESS.2020.2993448.
Cisco Technology, Inc. U.S. Appl. No. 17/302,253, "Electronically Steerable Antenna Array," filed Apr. 28, 2021.
Edward Au, "Specification Framwork for TGbe," IEEE 802.11-19/1262r10 dated Jun. 17, 2020.
Shuangfeng Han, Chih-Lin I, Zhikun Xu, and Corbett Rowell, "Large-Scale Antenna Systems with Hybrid Analog and Digital Beamfomning for Millimeter Wave 5G," Millimeter-Wave Communications for 5G, IEEE, 2015, 9 pages.
Mohamed Shehata, Ali Mokh, Matthieu Crussière, Maryline Hélard, Patrice Pajusco. On the Equivalence of Hybrid Beamforming to Full Digital Zero Forcing in mmWave MIMO. 26th International Conference on Telecommunication (ICT 2019), Apr. 2019, Hanoi, Vietnam. ffhal-01976833f.

* cited by examiner

REDUCING LEAKAGE IN MULTI-LINK DEVICES

TECHNICAL FIELD

Embodiments presented in this disclosure generally relate to multi-link devices. More specifically, embodiments disclosed herein reducing interference and leakage in multi-link devices.

BACKGROUND

Multi-link devices can communicate with other multi-link devices over multiple links established using multiple radios of the multi-link devices. Communicating over multiple links simultaneously may increase throughput. Although the radios of a multi-link device communicate over different bands or channels, due to the physical proximity of the radios in a multi-link device, the radios may still interfere with each other as a result of power leakage.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes measuring an interference caused by a first radio in a multi-link device to a second radio of the multi-link device and in response to determining that the interference exceeds a threshold, repeatedly narrowing a transmission beam width of the first radio until the interference falls below the threshold. Other embodiments include a multi-link device that performs this method.

According to another embodiment, a method includes receiving a first beam from a first radio of a multi-link device and transmitting a second beam from a second radio. A beam width of the first beam is repeatedly narrowed until an interference caused by the first beam to the second beam is reduced below a threshold. Other embodiments include a multi-link device that performs this method.

Example Embodiments

This disclosure describes a multi-link device (e.g., a user device or a network access point) that measures the interference caused by a first radio of the multi-link device to a second radio of the multi-link device. To reduce the interference, the multi-link device repeatedly narrows the width of a beam of one of the radios. The multi-link device may also tilt the radio or reduce the radio's transmission power in addition to narrowing the beam width. In this manner, the multi-link device reduces power leakage and interference between the two radios, which improves the performance of the multi-link device, in particular embodiments.

Figure 1:
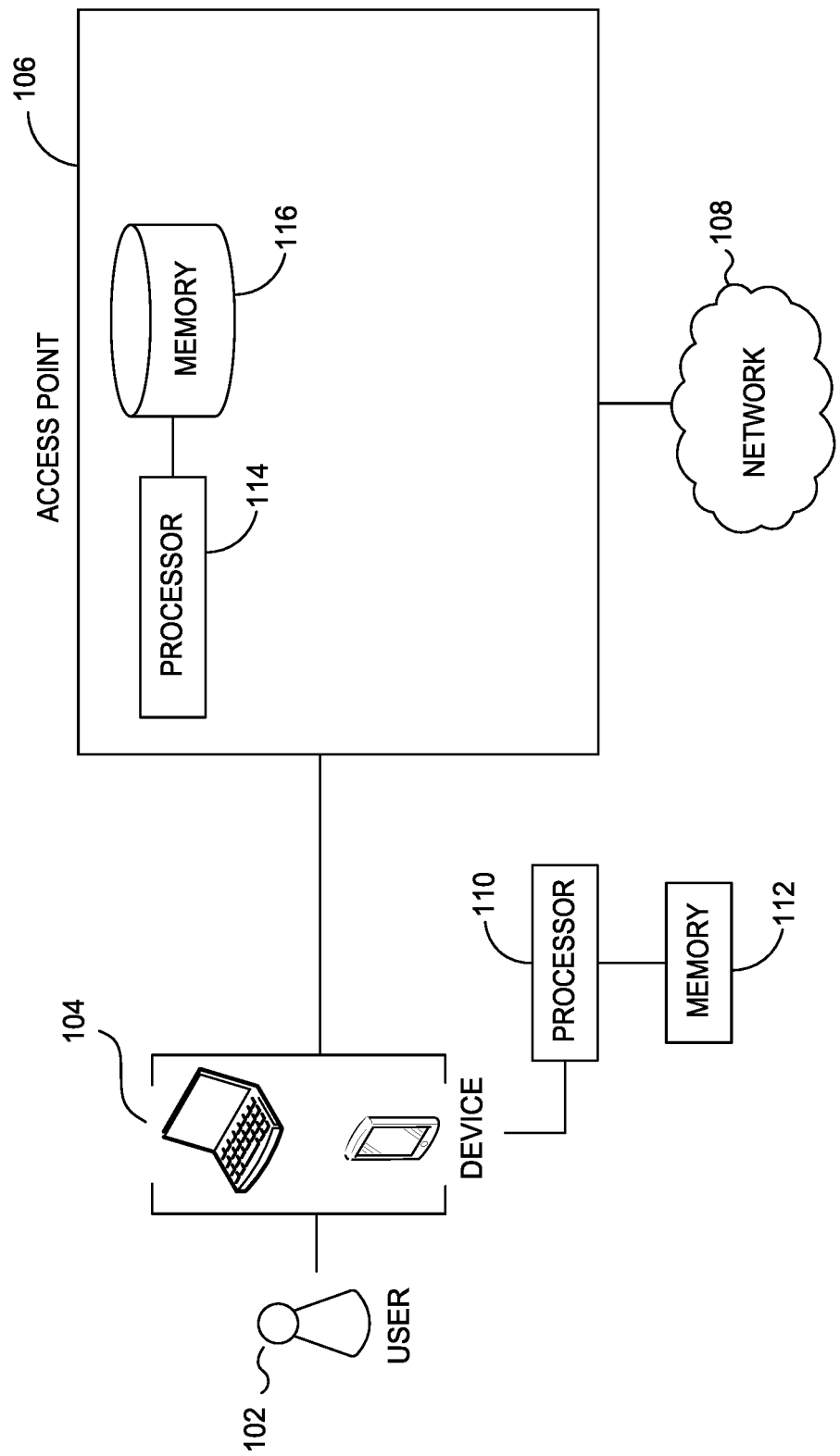
FIG. 1 illustrates an example system.

FIG. 1 illustrates an example system 100. As seen in FIG. 1, the system 100 includes one or more devices 104, an access point 106, and a network 108. The one or more devices 104 and/or the access point 106 may be multi-link devices that communicate with each other over different links using different radios. These multi-link devices transmit and receive messages using different links or radios. The devices repeatedly narrow a beam width of a radio until an interference caused by the radio to other radios of the multi-link devices falls below a threshold. In this manner, the performance of the multi-link devices is improved, in particular embodiments.

A user 102 uses a device 104 to connect to the network 108 via the access point 106. The device 104 establishes a connection with the access point 106, and then communicates messages to and from the access point 106 over this connection. For example, the device 104 may establish a wireless fidelity (WiFi) connection with the access point 106. As seen in FIG. 1, the device 104 includes a processor 110 and a memory 112, which are configured to perform any of the functions or actions of the device 104 described herein.

The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the access point 106, network 108, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The access point 106 facilitates communication between the one or more devices 104 and the network 108. The access point 106 establishes connections with the one or more devices 104 and then communicates messages to and from the one or more devices 104 over the connection. As seen in FIG. 1, the access point 106 includes a processor 114 and a memory 116, which are configured to perform any of the functions or actions of the access point 106 described herein.

The processor 114 is any electronic circuitry, including, but not limited to one or a combination of microprocessors, microcontrollers, application specific integrated circuits (ASIC), application specific instruction set processor (ASIP), and/or state machines, that communicatively couples to memory 116 and controls the operation of the access point 106. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on the memory 116 to perform any of the functions described herein. The processor 114 controls the operation and administration of the access point 106 by processing information (e.g., information received from the devices 104, network 108, and memory 116). The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

The network 108 is any suitable network operable to facilitate communication. The network 108 may include any interconnecting system capable of transmitting audio, video, signals, data, messages, or any combination of the preceding. The network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As discussed previously, the one or more devices 104 and/or the access point 106 may be multi-link devices that communicate over multiple links using multiple radios. The multi-link devices may establish different links using these different radios over different bands and different channels. In some embodiments, these multi-link devices may communicate simultaneously with each other over these different links. For example, if the device 104 and the access point 106 are both multi-link devices, the device 104 and the access point 106 may communicate with each other over multiple links simultaneously. The device 104 may transmit messages to the access point 106 over one link while the access point 106 transmits messages to the device 104 over another link. Although the radios in the device 104 or the access point 106 communicate over different bands or channels, the radios in the device 104 or the radios in the access point 106 may still interfere with one another due to their physical proximity to each other. For example, because the radios in the device 104 are close to one another, power leakage from one radio may interfere with another one of the radios.

The device 104 and/or the access point 106 measure the interference between two radios and take remedial action if the interference exceeds a threshold, impacting performance. For example, the device 104 and/or the access point 106 may repeatedly narrow a transmission beam width of a radio until the interference caused by that radio falls below the threshold. Additionally, the device 104 and/or the access point 106 may physically tilt the radio and/or reduce a transmission power of the radio. In this manner, the interference caused by the radio is reduced, which improves the performance of the device 104 and/or the access point 106 in particular embodiments.

Figure 2:
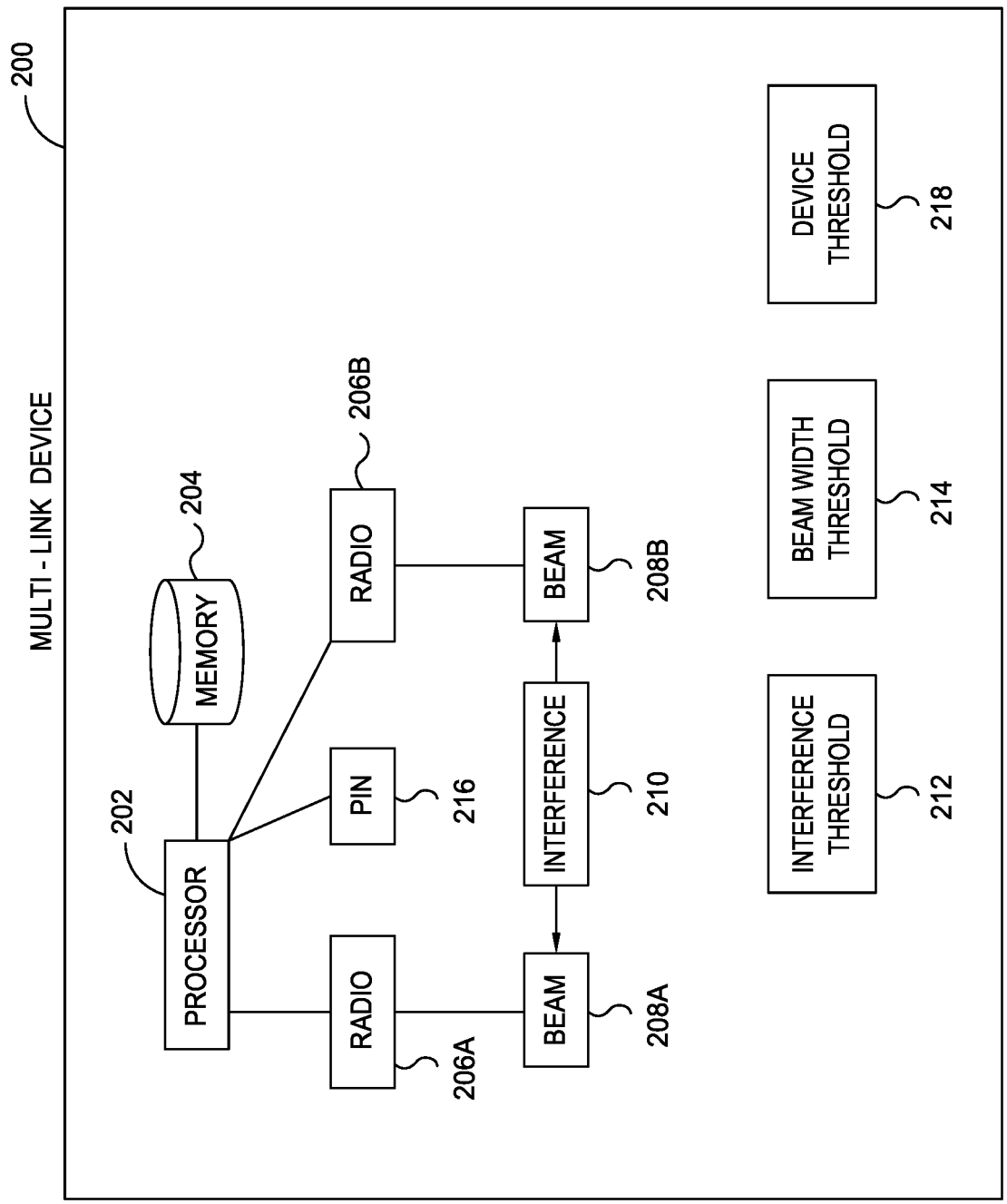
FIG. 2 illustrates an example multi-link device.

FIG. 2 illustrates an example multi-link device 200 of the system 100 of FIG. 1. As discussed previously, the multi-link device 200 may be a device 104 or access point 106. As seen in FIG. 2, the multi-link device 200 includes a processor 202, a memory 204, and radios 206A and 206B, which are configured to perform any of the functions or actions of the multi-link device 200 described herein. The processor 202 may be the processor 110 of the device 104 or the processor 114 of the access point 106. The memory 204 may be the memory 112 of the device 104 or the memory 116 of the access point 106.

The multi-link device 200 may include any suitable number of radios 206. The radios 206 are communicatively coupled to the processor 202. The processor 202 uses the radios 206 to transmit and receive messages from another device. The radios 206 operate over different bands and different channels. For example, the radio 206A may use a frequency that is different from the radio 206B. In some embodiments, the radios 206A and 206B are WiFi radios that communicate over different bands such as the 2.4 gigahertz band and the 5 gigahertz band. The multi-link device 200 may establish links simultaneously using the radios 206A and 206B. The multi-link device 200 may then communicate messages over both links simultaneously. For example, if the multi-link device 200 is the access point 106 in the system 100, then the access point 106 may use the radios 206A and 206B to establish two links with the device 104 simultaneously. The access point 106 may then transmit messages to the device 104 over one link using the radio 206A while receiving messages from the device 104 over the other link using the radio 206B. Alternatively or additionally, the access point 106 may transmit messages to the device 104 using both radios 206A and 206B simultaneously. In this manner, the multi-link device 200 increases message throughput and/or spectrum efficiency, in particular embodiments. Additionally, the multi-link device 200 reduces delays and/or power consumption, in certain embodiments.

The radios 206 transmit and receive messages using electromagnetic beams 208. For example, the radio 206A may transmit messages using a beam 208A, and the radio 206B may receive messages over a beam 208B that was formed by a transmitting device. Although the beams 208A and 208B may use different bands or channels, due to the physical proximity of the radios 206A and 206B, the beams 208A and 208B may interfere with one another. For example, power leakage or spectrum leakage may occur between the beams 208A and 208B, which may negatively impact the transmission or reception of messages using the beams 208A and 208B.

The multi-link device 200 measures an interference 210 between the beams 208A and 208B in any suitable manner. In some embodiments, the multi-link device 200 measures a signal strength over the radio 206B or the beam 208B. If the signal strength drops, it may indicate that the beam 208A is interfering (e.g., by power leakage or spectrum leakage) with the beam 208B. The amount that the signal strength drops may be proportional to the level of interference 210. In certain embodiments, the multi-link device 200 monitors or samples activity (e.g., signal strength) of an auxiliary radio over a pin 216 of the multi-link device 200. The pin 216 may be a general purpose input/output pin. If the signal strength of the auxiliary radio drops, it may indicate that interference is occurring. The amount that the signal strength drops may be proportional to the level of interference 210.

The multi-link device 200 compares the interference 210 with an interference threshold 212 to determine whether the measured interference 210 is at an acceptable level. If the interference 210 meets or exceeds the interference threshold 212, the multi-link device 200 takes remedial action to reduce the interference 210. For example, the multi-link device 200 may narrow a width of the beam 208A or the beam 208B to reduce the interference 210. The multi-link device 200 may then compare the reduced interference 210 with the interference threshold 212 to determine if the reduced interference 210 falls below the interference threshold 212. The multi-link device 200 may narrow the width of the beam 208A or the beam 208B again until the interference 210 is reduced below the interference threshold 212. By reducing the width of the beam 208A or the beam 208B the multi-link device 200 reduces the spectrum leakage or power leakage caused by the beam 208A or the beam 208B, which reduces the interference 210. For example, if the radio 206A is transmitting messages by forming the beam 208A, the multi-link device 200 may reduce the width of the beam 208A to reduce the interference 210.

In some embodiments, the multi-link device 200 compares the width of the beam 208A or the beam 208B to a beam width threshold 214 after the width of the beam 208A or the beam 208B has been reduced. The beam width threshold 214 indicates a minimum beam width below which the width of the beams 208A or 208B should not fall. After reducing the width of the beam 208A or the beam 208B, the multi-link device 200 determines if the width falls below the beam width threshold 214. If the width of the beam 208A or the beam 208B falls below the beam width threshold 214, the multi-link device 200 incrementally increases the width of the beam 208A or the beam 208B until the width of the beam 208A or the beam 208B meets or exceeds the beam width threshold 214. In this embodiment, the multi-link device 200 produces a beam 208 with a width that exceeds the beam width threshold 214 but causes an interference 210 that falls below the interference threshold 212.

In particular embodiments, after the multi-link device 200 narrows the beam width, the multi-link device 200 determines whether the narrowed beam width reduces a number of devices within line of sight of the multi-link device 200 below a device threshold 218. If the narrowed beam width reduces the number of devices below the device threshold 218, the multi-link device 200 increases the beam width until the number of devices meets or exceeds the device threshold 218. In this manner, the multi-link device 200 does not narrow the beam width so much that the multi-link device 200 cannot use the beams 208 to effectively communicate with other devices.

In certain embodiments, after the multi-link device 200 determines an appropriate beam width, the multi-link device 200 sets that beam width for the entire multi-link operation of the multi-link device 200. The multi-link device 200 may set each beam 208 of the multi-link device to that beam width or each radio 206 of the multi-link device 200 to operate according to that beam width. In this manner, the multi-link device 200 reduces the interference 210 during multi-link operation.

Figure 3:
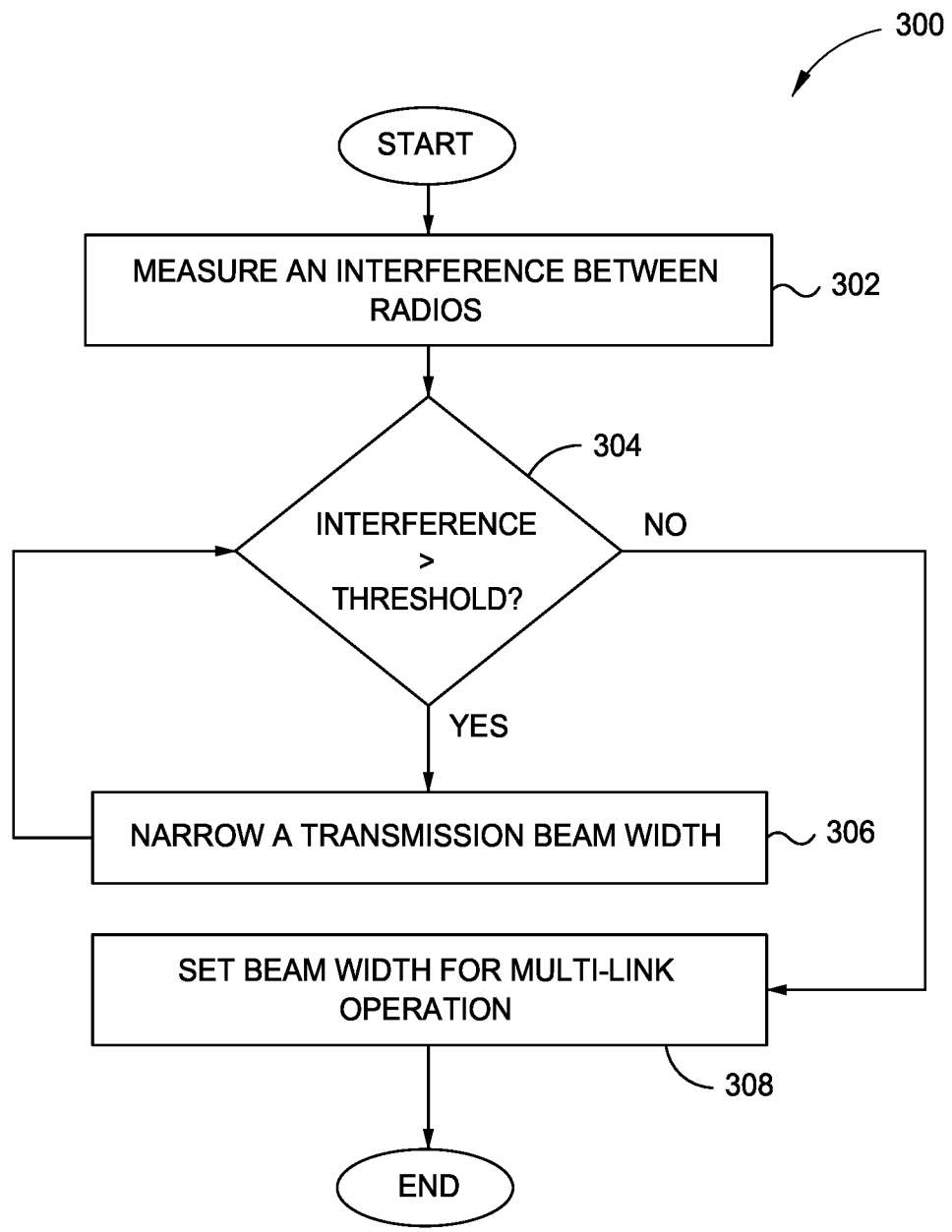
FIG. 3 is a flowchart of an example method performed in the system of FIG. 1.

FIG. 3 is a flowchart of an example method 300 performed in the system 100 of FIG. 1. The multi-link device 200 (e.g., the device 104 or the access point 106) may perform the method 300. In particular embodiments, by performing the method 300, the multi-link device 200 reduces an interference 210 caused by a radio 206 of the multi-link device 200.

In block 302, the multi-link device 200 measures an interference 210 between the radios 206 of the multi-link device 200. The radios 206 may be transmitting or receiving messages using electromagnetic beams 208. The interference 210 may be caused by the physical proximity of the radios 206, which results in spectrum leakage or power leakage between the beams 208. In some embodiments, the multi-link device 200 determines the interference 210 by monitoring a signal strength a radio 206 of the multi-link device. For example, the multi-link device 200 may monitor the signal strength of a radio 206 over a pin 216 of the multi-link device 200. If the signal strength drops, it may indicate a level of interference 210.

In block 304, the multi-link device 200 determines whether the interference 210 exceeds an interference threshold 212. If the interference 210 exceeds the interference threshold 212, the multi-link device 200 narrows a width of a transmission beam 208 in block 306. Narrowing the width of the transmission beam 208 reduces the interference 210 caused by the transmission beam 208 on other beams 208 of the multi-link device 200. The multi-link device 200 then returns to block 304 to determine whether the reduced interference 210 still exceeds the threshold 212. If the reduced interference continues to exceed the interference threshold 212, the multi-link device 200 proceeds to block 306 to again narrow the width of the transmission beam 208.

If the interference 210 or the reduced interference does not exceed the threshold 212, the multi-link device 200 continues to block 308 to set the beam width for multi-link operation. For example, the multi-link device 200 may set the beam width for multiple radios 206 of the multi-link device 200 to be the narrowed beam width determined in blocks 304 and 306. In this manner, the multi-link device 200 reduces the interference 210 caused by the radios 206 of the multi-link device 200 in certain embodiments.

In particular embodiments, after the multi-link device 200 determines the appropriate width for the beam 208A or the beam 208B the multi-link device 200 sets that beam width for multiple radios 206 of the multi-link device 200. For example, after the multi-link device 200 determines the appropriate width for the beam 208A, the multi-link device 200 may set that beam width for the radios 206A and 206B. For example, the beam 208B may also have its width set to the width of the beam 208A. In this manner, the multi-link device 200 sets the beam width for the entire multi-link operation of the multi-link device 200.

Figure 4:
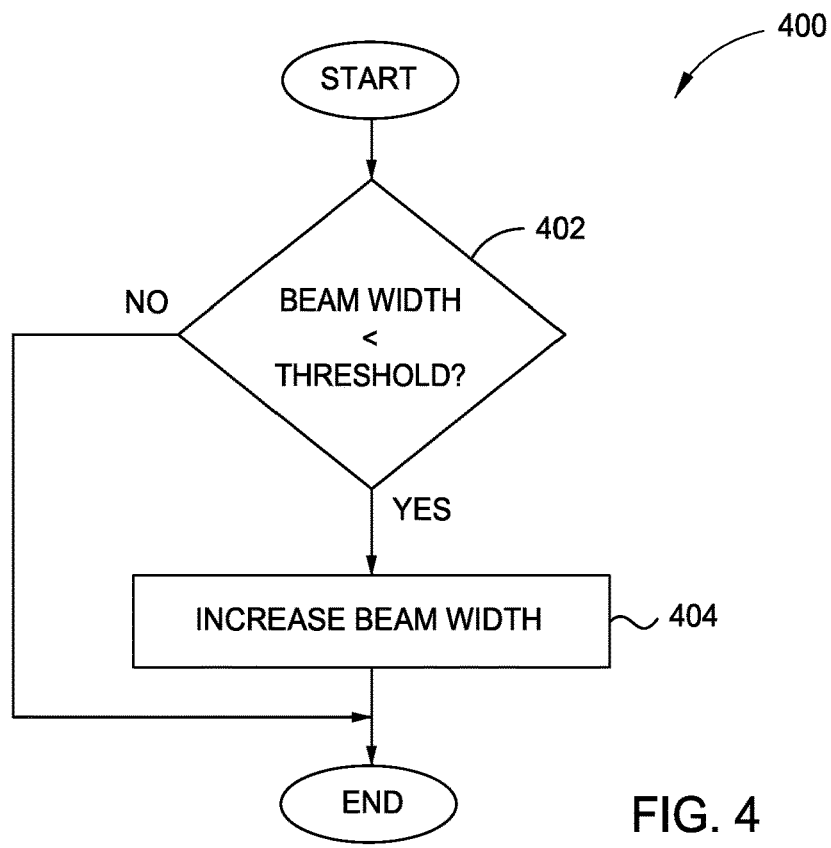
FIG. 4 is a flowchart of an example method performed in the system of FIG. 1.

FIG. 4 is a flowchart of an example method 400 performed in the system 100 of FIG. 1. The multi-link device 200 (e.g., the device 104 or the access point 106) performs the method 400. In particular embodiments, by performing the method 400, the multi-link device 200 determines and establishes an appropriate beam width for multi-link operation.

In block 402, the multi-link device 200 determines whether a beam width falls below a beam width threshold 214. In one embodiment, the multi-link device 200 performs the block 402 after determining that the beam width has been narrowed below the interference threshold 212 in blocks 304 and 306 of the method 300. If the beam width meets or exceeds the beam width threshold 214, then the multi-link device 200 concludes the method 400.

If the beam width falls below the beam width threshold 214, the multi-link device 200 increases the beam width in block 404. For example, the multi-link device 200 may incrementally increase the beam width such that the beam width exceeds the beam width threshold 214 but causes an interference 210 that falls below the interference threshold 212. In some embodiments, the multi-link device 200 increases the beam width by setting the beam width to be equal to the beam width threshold 214.

In certain embodiments, if the beam width cannot be reduced such that (1) the beam width meets or exceeds the beam width threshold 214 and (2) the interference 210 is reduced below the interference threshold 212, the multi-link device 200 adjusts the beam width to satisfy one of the thresholds. For example, the multi-link device 200 may narrow the beam width below the beam width threshold 214 as little as possible until the interference threshold 212 is satisfied. As another example, the multi-link device 200 may set the beam width to be equal to the beam width threshold 214. In some embodiments, the multi-link device 200 instead balances the interference 210 and the beam width. For example, the multi-link device 200 may adjust the beam width such that both the interference threshold 212 and the beam width threshold 214 are not satisfied, but the adjusted beam width may minimize the amounts by which the interference threshold 212 and the beam width threshold 214 are not satisfied.

Figure 5:
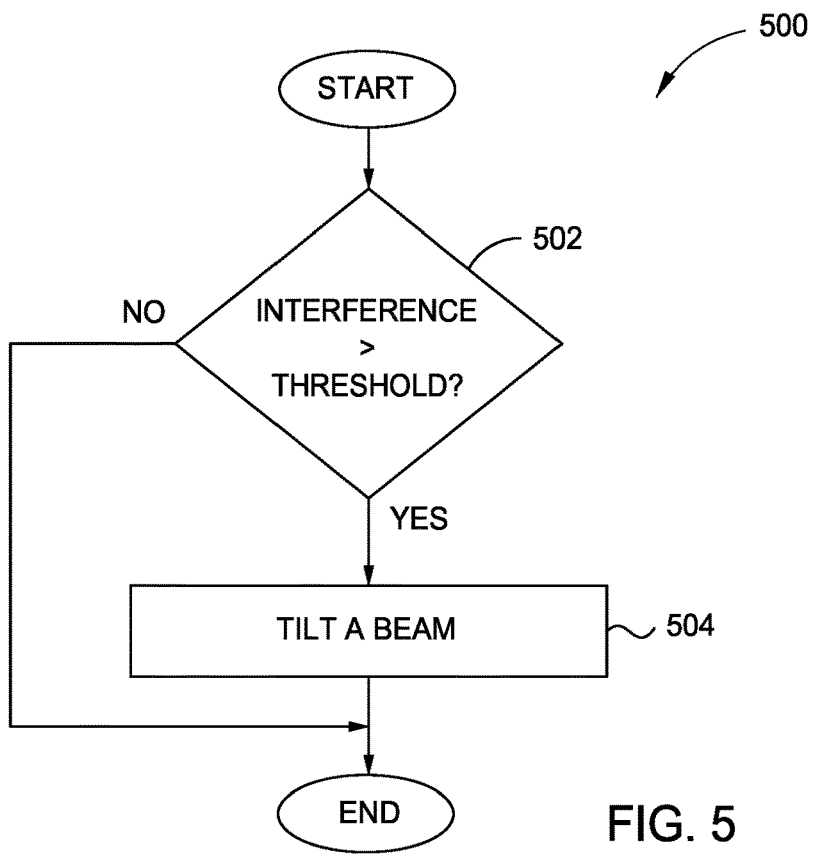
FIG. 5 is a flowchart of an example method performed in the system of FIG. 1.

FIG. 5 is a flowchart of an example method 500 performed in the system 100 of FIG. 1. The multi-link device 200 (e.g., the device 104 or the access point 106) performs the method 500. In particular embodiments, by performing the method 500, the multi-link device 200 reduces an interference 210 caused by a radio 206.

In block 502, the multi-link device 200 determines whether a measured interference 210 exceeds an interference threshold 212. The block 502 may be the same as the block 304 in the method 300. If the measured interference 210 is below the interference threshold 212, the multi-link device 200 concludes the method 500.

If the measured interference 210 exceeds the inference threshold 212, the multi-link device 200 tilts a beam 208 in block 504. The multi-link device 200 may electronically tilt the beam 208 of one radio 207 away from another beam 208 of another radio 206 of the multi-link device 200. For example, the multi-link device 200 may adjust the phasing of antenna elements in a radio 506 to tilt the beam 208 emitted from that radio 506 in a particular direction away from another beam 208 of another radio 206. In this manner, the multi-link device 200 reduces the spectrum leakage or power leakage caused by the beam 208, which reduces the measured interference 210. In certain embodiments, the multi-link device 200 tilts the beam 208 in addition to narrowing the transmission beam width in block 306 of the method 300.

In some embodiments, the multi-link device 200 tilts the beam 208 according to a geographic location of another device. For example, if the system 100 included multiple devices 104 in communication with the access point 106, the access point 106 may determine the geographic locations of the devices 104 and tilt beams 208 away from devices 104 that are not meant to receive messages over those beams 208. As a result, the access point 106 reduces the interference 210 caused by those beams 208.

Figure 6:
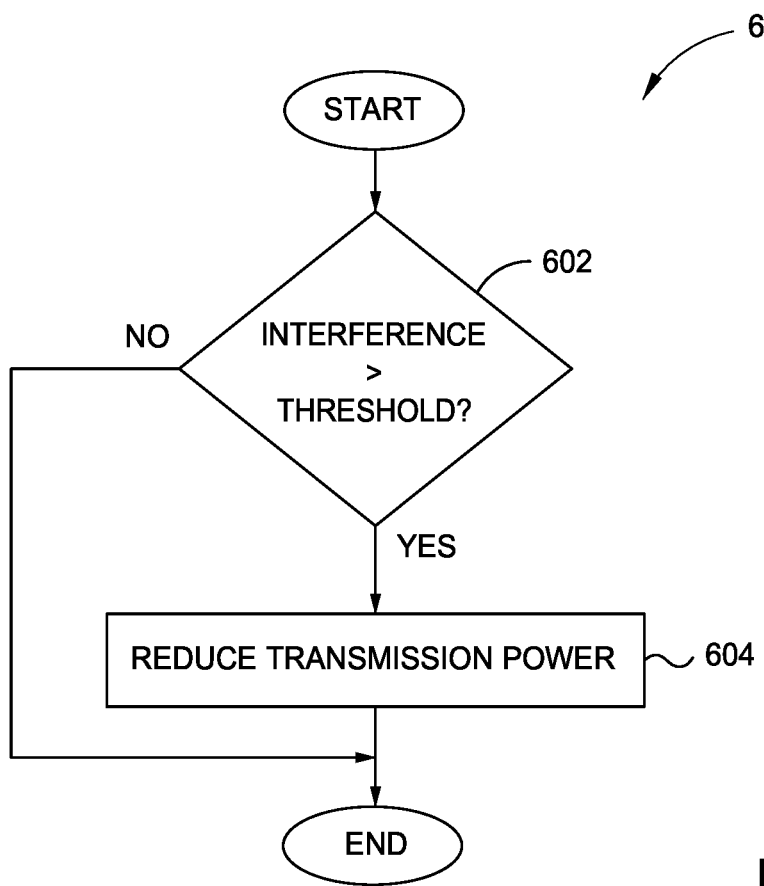
FIG. 6 is a flowchart of an example method performed in the system of FIG. 1.

FIG. 6 is a flowchart of an example method 600 performed in the system 100 of FIG. 1. The multi-link device 200 (e.g., the device 104 or the access point 106) performs the method 600. In particular embodiments, by performing the method 600 the multi-link device 200 reduces an interference 210 caused by a radio 206 of the multi-link device 200.

In block 602, the multi-link device 200 determines whether a measured interference 210 exceeds an interference threshold 212. The block 602 may be the same as the block 304 in the method 300. If the measured interference is below the interference threshold 212, the multi-link device 200 concludes the method 600.

If the measured interference 210 exceeds the interference threshold 212, the multi-link device 200 reduces a transmission power of the radio 206 in block 604. By reducing the transmission power of the radio 206, the multi-link device 200 reduces the spectrum leakage or power leakage caused by the radio 206, which reduces the interference 210. In certain embodiments, the multi-link device 200 reduces the transmission power in addition to narrowing the transmission beam width in block 306 of the method 300 and/or tilting the radio 206 in block 504 of the method 500.

Figure 7:
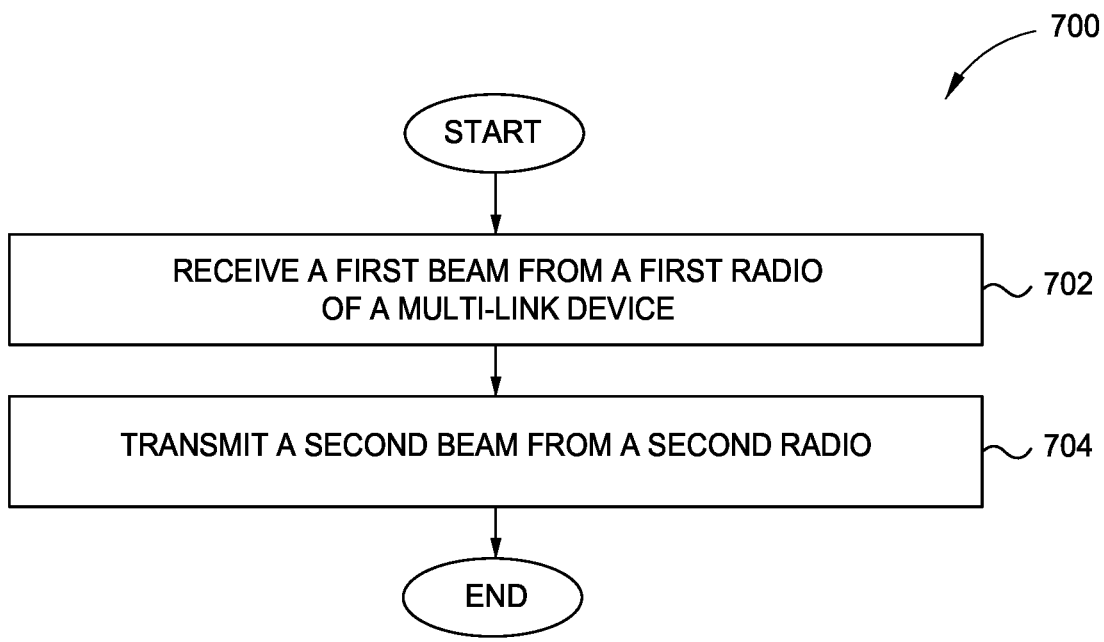
FIG. 7 is a flowchart of an example method performed in the system of FIG. 1.

FIG. 7 is a flowchart of an example method 700 performed in the system 100 of FIG. 1. The multi-link device 200 (e.g., the device 104 or the access point 106) performs the method 700. Generally, the methods 300, 400, 500, and 600 were performed by the multi-link device 200 serving as a transmitting device. In the method 700, the multi-link device 200 serves as a receiving device.

In block 702, the multi-link device 200 receives a first beam 208A from a first radio 206A of another multi-link device. The other multi-link device may be transmitting a message using the beam 208A of the radio 206A. The multi-link device 200 may receive the message over the first beam 208A.

In block 704, the multi-link device 200 transmits a second beam 208B from a second radio 206B of the multi-link device 200. The other multi-link device may receive the second beam 208B. The other multi-link device may measure an interference 210 between the first beam 208A and the second beam 208B. The other multi-link device may then narrow a width of the first beam 208A to reduce the interference 210 between the beams 208A and 208B. The other multi-link device may repeatedly narrow the width of the first beam 208A until the interference 210 falls below an interference threshold 212.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   measuring an interference caused by a first wireless fidelity (WiFi) radio in a multi-link device communicating over a first band to a second WiFi radio in the multi-link device communicating over a second band different from the first band; and
   in response to determining that the interference caused by the first WiFi radio to the second WiFi radio exceeds a threshold, repeatedly narrowing a transmission beam width of the first WiFi radio until the interference caused by the first WiFi radio to the second WiFi radio falls below the threshold.

2. The method of claim 1, further comprising tilting a beam of the first WiFi radio in addition to narrowing the transmission beam width.

3. The method of claim 2, wherein tilting the beam is based on a geographic location of a device.

4. The method of claim 1, wherein measuring the interference comprises sampling activity over a general-purpose input/output pin of the multi-link device.

5. The method of claim 1, wherein measuring the interference comprises measuring a signal strength of signals received by the second WiFi radio.

6. The method of claim 1, further comprising determining that the transmission beam width does not fall below a minimum beam width threshold.

7. The method of claim 1, further comprising determining that narrowing the transmission beam width does not reduce a number of devices within line of sight of the multi-link device below a device threshold.

8. The method of claim 1, further comprising reducing a transmission power of the first WiFi radio in addition to narrowing the transmission beam width.

9. A multi-link device comprising:
   a first WiFi radio;
   a second WiFi radio;
   a memory; and
   a hardware processor communicatively coupled to the memory, the first WiFi radio, and the second WiFi radio, the hardware processor configured to:
      measure an interference caused by the first WiFi radio communicating over a first band to the second WiFi radio communicating over a second band different from the first band; and
      in response to determining that the interference caused by the first WiFi radio to the second WiFi radio exceeds a threshold, repeatedly narrowing a transmission beam width of the first WiFi radio until the interference caused by the first WiFi radio to the second WiFi radio falls below the threshold.

10. The multi-link device of claim 9, wherein the hardware processor is further configured to tilt a beam of the first WiFi radio in addition to narrowing the transmission beam width.

11. The multi-link device of claim 10, wherein tilting the beam is based on a geographic location of a device.

12. The multi-link device of claim 9, wherein measuring the interference comprises sampling activity over a general-purpose input/output pin of the multi-link device.

13. The multi-link device of claim 9, wherein measuring the interference comprises measuring a signal strength of signals received by the second WiFi radio.

14. The multi-link device of claim 9, wherein the hardware processor is further configured to determine that the transmission beam width does not fall below a minimum beam width threshold.

15. The multi-link device of claim 9, wherein the hardware processor is further configured to determine that narrowing the transmission beam width does not reduce a number of devices within line of sight of the multi-link device below a device threshold.

16. The multi-link device of claim 9, wherein the hardware processor is further configured to reduce a transmission power of the first WiFi radio in addition to narrowing the transmission beam width.

* * * * *